Patented June 17, 1930

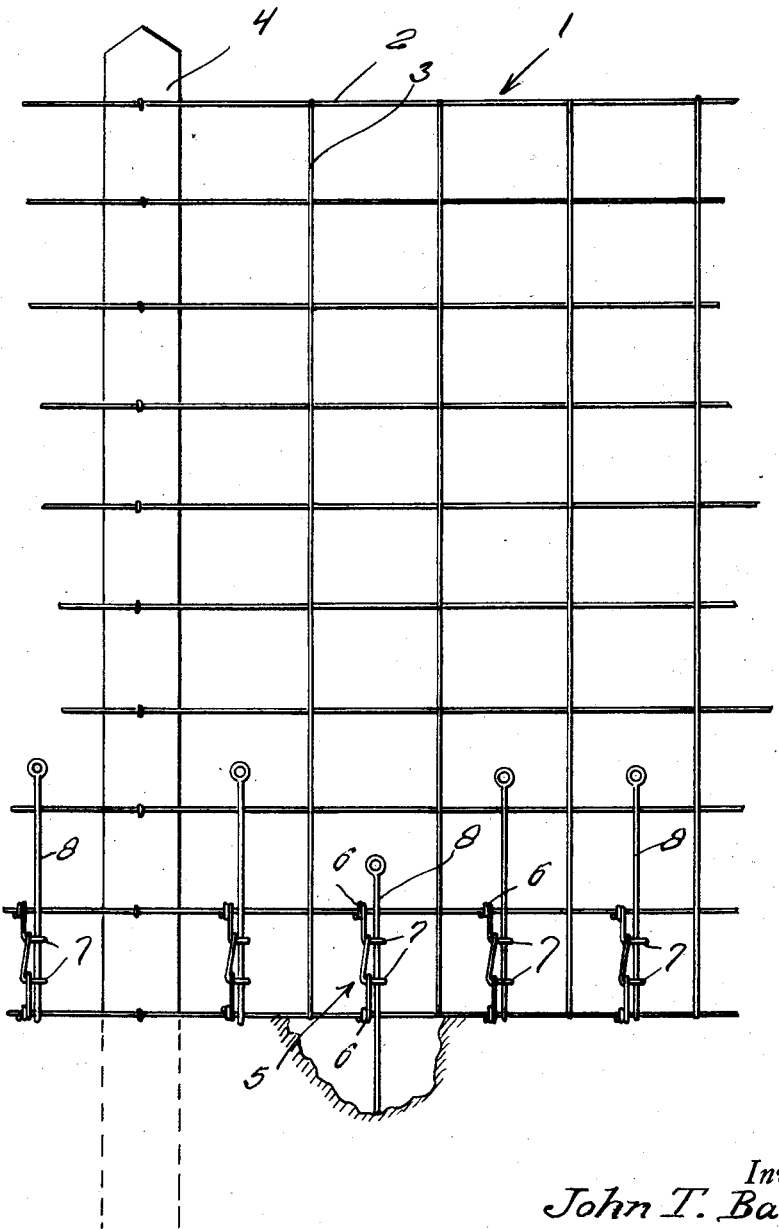

1,764,284

UNITED STATES PATENT OFFICE

JOHN T. BARTON, OF SAN ANGELO, TEXAS

FENCE

Application filed November 14, 1929. Serial No. 407,261.

This invention relates to an improved fence which is particularly, but not necessarily, designed for use in portions of the country inhabited by certain classes of animals who gain entrance to farms by boring through the ground beneath the fence.

The present invention relates to an improvement used in association with the lower portion of the fence so that animals are prevented from crawling beneath the fence through the hole which may have been dug by them.

Briefly, the improvement relates to a plurality of vertical gravity lowered drop wires which act as automatic followers so as to provide a closure for any hole dug beneath the fence by the animal.

The particular features and advantages of the preferred construction will become apparent from the following description and drawings.

In the drawings:—

The single figure represents a fragmentary portion of a conventional wire fence equipped with an animal guard constructed in accordance with the present invention.

Referring to the drawing in detail, the reference character 1 designates generally a conventional wire fence made up of horizontal and vertical wires 2 and 3 respectively. These are connected together in any common way and are usually arranged close enough together to prevent comparatively small animals from going through the fence. Ordinarily, these fences are rather high and are appropriately supported on posts 4 as usual. However, while the animal may not be able to get through between the wires in the fence and may not be able to climb over the fence, it has been found that they frequently bore or dig a hole beneath the fence and get into the field in this way.

As before intimated, this is a disadvantage which, as far as I know, has never been overcome. Accordingly, I have provided an improved construction and arrangement of details which will no doubt prevent animals from entering and at such places.

In carrying out the invention, I employ a plurality of duplicate members indicated generally at 5. Each member is composed of a single length of wire having its opposite ends coiled around the two horizontal fence wires 2 as indicated at 6. The intermediate portion of the wire is bent upon itself to provide horizontally disposed vertically alined guide eyes 7. Slidable through these guide eyes is a gravity lowered drop-wire 8 of any suitable length.

In practice, the guide members 5 are connected to the two lowermost horizontal wires of the fence at points intermediate the vertical wires 3. This disposes the devices sufficiently close to each other to prevent the average animal from getting beneath the fence in case he bores a hole in the ground. I have attempted to demonstrate the manner in which the device operates in the drawings. Here, it will be seen that a hole has been dug in the ground beneath one of the devices and the drop wire is shown lowered into the hole so as to provide a guard and then prevent the animal from crawling through the hole beneath the fence.

It is believed that a careful consideration of the description and drawings will enable persons skilled in the art to which the invention relates to obtain a clear understanding of the same. Therefore, a more lengthy description is thought unnecessary.

While I have shown and described the preferred embodiment of the invention, it is to be understood that minor changes coming within the field of invention claimed, may be resorted to if desired.

Having thus described my invention, what I claim as new is:—

In a structure of the class described, a fence guard in the form of an attachment for the lower wires of a wire fence, said attachment being intended to prevent animals from crawling beneath the fence through a hole dug by the animals, said attachment comprising a guide member formed from a single length of wire having its intermediate portion bent to provide a pair of vertically spaced horizontal guide eyes and having its ends constructed for bending around a pair of the lower horizontal fence wires, and a gravity lowered drop wire freely slidable through the guide eyes and adapted to have its lower end disposed in said hole, said drop wire being formed at its lower end with an eye.

In testimony whereof I affix my signature.

JOHN T. BARTON.